United States Patent [19]

Goebel

[11] Patent Number: 6,009,272

[45] Date of Patent: Dec. 28, 1999

[54] REGISTER ALLOCATION VIA SELECTIVE SPILLING

[75] Inventor: Kurt J. Goebel, Mountain View, Calif.

[73] Assignee: Sun Microsystems, Inc., Palo Alto, Calif.

[21] Appl. No.: 08/885,564

[22] Filed: Jun. 30, 1997

[51] Int. Cl.[6] ...................................................... G06F 9/45
[52] U.S. Cl. .......................... 395/709; 395/707; 395/708; 712/217
[58] Field of Search ..................................... 395/705, 706, 395/707, 708, 709; 712/217

[56] References Cited

U.S. PATENT DOCUMENTS

| | | | |
|---|---|---|---|
| 4,571,678 | 2/1986 | Chaitin ..................................... | 395/707 |
| 4,763,255 | 8/1988 | Hopkins et al. ......................... | 364/300 |
| 4,782,444 | 11/1988 | Munshi et al. .......................... | 364/300 |
| 5,233,691 | 8/1993 | Ando et al. .............................. | 395/250 |
| 5,249,295 | 9/1993 | Briggs et al. ............................ | 395/650 |
| 5,418,958 | 5/1995 | Goebel .................................... | 395/709 |
| 5,481,706 | 1/1996 | Peek ........................................ | 395/650 |
| 5,530,866 | 6/1996 | Koblenz et al. ......................... | 395/707 |
| 5,590,329 | 12/1996 | Goodnow, II et al. ................. | 395/708 |
| 5,659,754 | 8/1997 | Grove et al. ............................. | 395/709 |
| 5,761,514 | 6/1998 | Aizikowitz et al. ..................... | 395/709 |
| 5,774,730 | 6/1998 | Aizikowitz et al. ..................... | 395/709 |
| 5,778,233 | 7/1998 | Besaw et al. ............................ | 395/709 |

FOREIGN PATENT DOCUMENTS 0 051 131   5/1982   European Pat. Off. .

OTHER PUBLICATIONS

Fred C. Chow et al., "The Priority–Based Coloring Approach to Register Allocation", 10872 ACM Transactions on Programming Languages and Systems, vol. 12, No. 4, Oct. 1990, pp. 501–536.

Gregory J. Chaitin et al., "Register Allocation Via Coloring", 10871 Computer Languages, vol. 6, 1981, pp. 47–57.

Weaver, David L. et al., "The SPARC Architecture Manual" Prentice Hall, Version 9, (1991) pp. 294–298.

Aho, Alfred V. et al., "Intermediate Code Generation", *Compilers Principles, Techniques and Tools,* Chapter 8, Addison–Wesley, (1988), pp. 463–512.

Kolson et al., "Optimal Register Assignment to Loops for Embedded Code Generation", Association for Computing Machinery, 1995, pp. 42–47.

Callahan et al., "Register Allocation via Interference Graph Coloring", Proceedings of the ACM SIGPLAN Conference on Programming Language Design and Implementation, 1991, pp. 192–203.

*Primary Examiner*—Tariq R. Hafiz
*Assistant Examiner*—Kakali Chaki
*Attorney, Agent, or Firm*—McDermott, Will & Emery

[57] ABSTRACT

An approach for allocating a set of virtual registers to a set of physical registers using selective spilling is described. A set of code and a spill variable are specified. A code region hierarchy containing a set of code regions is determined based upon the set of code. The first level of the code region hierarchy is evaluated and if the spill variable is referenced in more than one code region, code for performing a spill operation on the specified spill variable is added to the set of code based upon a code region which defines the specified spill variable. In addition, code for performing a reload operation on the specified spill variable is added to the set of code based upon code regions that use the specified spill variable. If the spill variable is only referenced in a single code region in the first level of the code region hierarchy, then code regions that are both in a second level of the code region hierarchy and which correspond to the code region in the first level which references the spill variable are analyzed and code added in a similar manner.

15 Claims, 9 Drawing Sheets

REGISTER ALLOCATION VIA SELECTIVE SPILLING

BACKGROUND OF THE INVENTION

1. Field of the Invention

The invention relates to programming language compilers, and more specifically, to a method and apparatus for allocating registers via selective spilling.

2. Description of Related Art

An important function of an optimizing compiler is allocating physical registers to be used when code instructions generated by the optimizing compiler are executed. Physical registers are actual hardware registers supported by the particular platform on which the code instructions are executed. Ideally code instructions are executed in the available physical registers without requiring any additional physical registers. However, in many situations, the execution of code instructions requires more than the number of available physical registers. For example, the execution of a sequence of code instructions may require more intermediate values than the number of available physical registers. In these situations, the physical registers must be allocated to provide for the execution of the code instructions.

One approach for allocating physical registers used by contemporary optimizing compilers is a multi-pass approach. In one pass, data specified by processed code instructions is assigned to a set of virtual or "symbolic" registers which are sometimes considered to be infinite in number, but for practical reasons, are usually limited to some fairly large number. During a subsequent pass, the set of virtual registers is assigned to a set of physical registers. For situations when the number of virtual registers is less than or equal to the number of physical registers, the contents of each of the virtual registers can be directly assigned to a physical register. However, when the number of virtual registers exceeds the number of physical registers, then the set of virtual registers must be mapped to the set of physical registers. In the context of compilers, mapping a set of virtual registers to a set of physical registers refers to determining an assignment of the set of virtual registers to the set of physical registers so that computations specified by a set of code instructions can be performed in the set of physical registers.

One approach for mapping a set of virtual registers to a set of physical registers is known as the graph coloring approach which is described in U.S. Pat. No. 4,571,678 issued to Chaitin on Feb. 18, 1986. Generally, the graph coloring approach involves constructing and analyzing a register interference graph for a set of code instructions. Each virtual register is represented in the register interference graph as a node. Two nodes are connected when the contents of two virtual registers represented by the nodes cannot simultaneously share a physical register at some point in time during the execution of the code instructions, effectively representing a conflict between the two nodes.

The register interference graph is then analyzed and nodes having fewer connections than the number of available physical registers are removed from the graph. If all of the nodes can be removed from the graph, then a coloring can be determined. That is, all of the virtual registers can be mapped to the available physical registers. However, sometimes the register interference graph contains one or more nodes having more connections to other nodes than the number of available physical registers. This means that the number of available physical registers is insufficient to store all of the intermediate values specified by the code instructions. Thus, some intermediate values must be stored in other memory.

The process of temporarily storing data from a physical register to another memory location is referred to as "spilling." Generally, spilling involves performing a spill operation, followed by one or more reload operations. The spill operation causes data contained in a physical register to be stored in another memory location, such as a runtime stack. Each reload operation causes the data to be loaded or copied from the other memory location into a physical register. Reload operations are performed when the data is required for a calculation.

In terms of the register interference graph, a spill is reflected in the graph by disconnecting a node from all other nodes in the graph. Then the graph is rebuilt and analyzed again. Any nodes that have been spilled have no connections to other nodes and are removed from the graph when the graph is analyzed. This process is repeated until a mapping of the set of virtual registers to the set of physical registers is determined.

Figure 1:
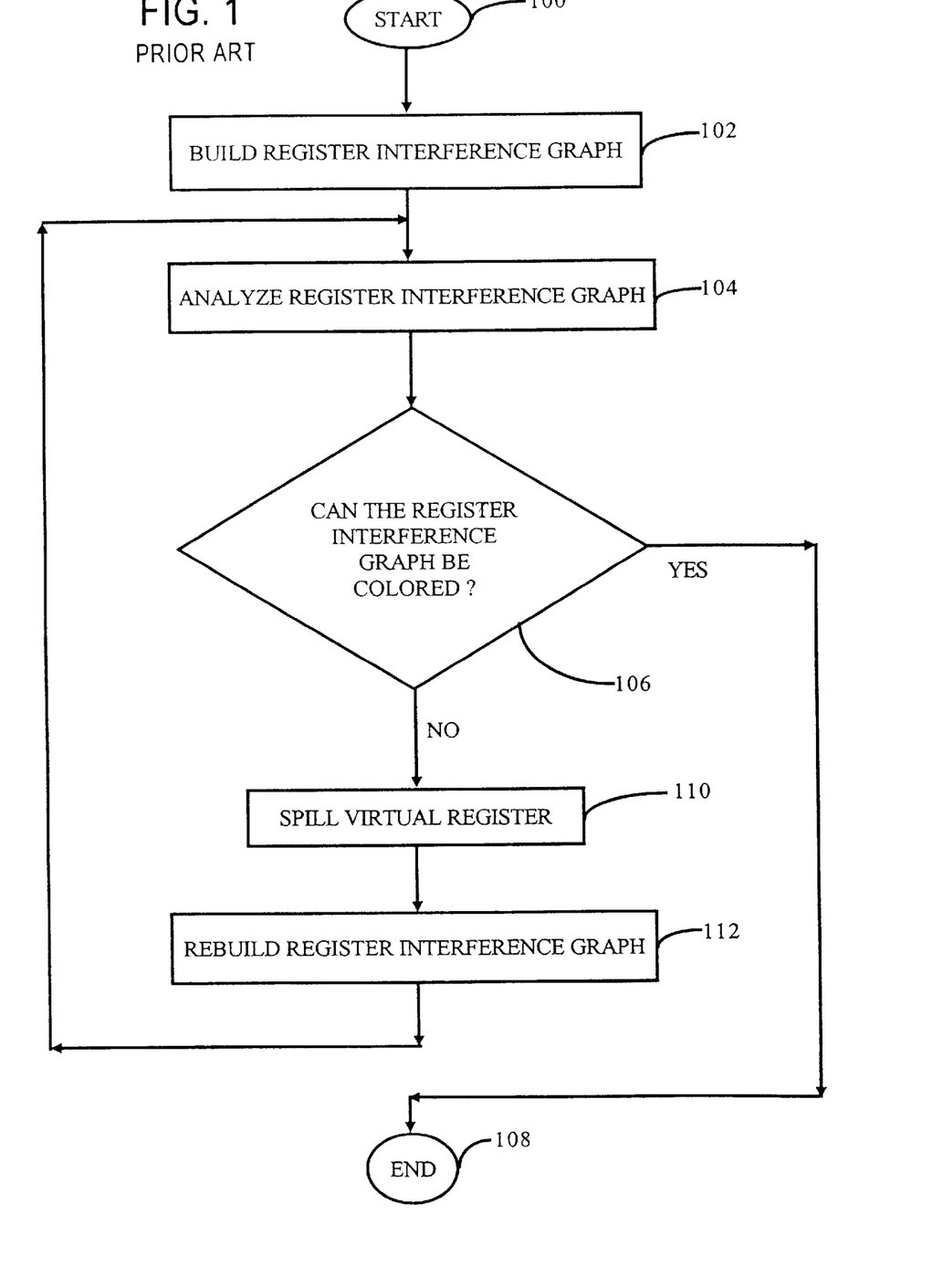
FIG. 1 is a flow chart illustrating a method for mapping a set of virtual registers to a set of physical registers using graph coloring.

The high level approach for mapping a set of virtual registers to a set of physical registers according to the graph coloring approach is illustrated by the flow chart of FIG. 1. After starting in step 100, a register interference graph is built in step 102. Then in step 104, the register interference graph is analyzed. As previously described, analyzing the register interference graph involves removing any nodes which have fewer connections to other nodes than the number of available physical registers.

In step 106, a determination is made as to whether the register interference graph can be colored. As previously discussed, if all of the nodes can be removed from the graph, indicating that there are no conflicts, then the graph can be colored. If so, then the process is complete in step 108. On the other hand, if in step 106 the graph cannot be colored, then in step 110, one of the virtual registers is spilled, which eliminates the spilled register as a conflicted node in the graph. In step 112 the register interference graph is rebuilt and then steps 104 through 112 are repeated until the register graph is colored.

The Problems

Although the spilling approach allows a set of virtual registers to be mapped to a set of physical registers, the approach does have some disadvantages. One disadvantage is that additional code instructions must be executed to perform the spill and reload operations. This increases the overall time required to process a sequence of code instructions which provides for the spilling of data. In addition, write and read operations to secondary storage media, such as runtime stacks, often take more time to execute than write and read operations to physical registers, such as Central Processing Unit (CPU) registers. Conventional spilling approaches add code instructions to perform a spill operation after data to be spilled is defined, and also add code instructions to perform a reload operation at each location in the code instructions where the data to be spilled is referenced. In many instances, this approach can result in a significant amount of extra code.

Figure 2A:
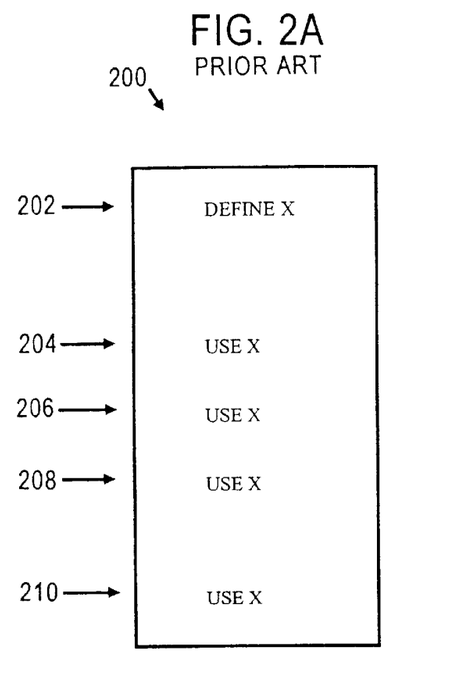
FIG. 2A illustrates a code block containing references to a variable X.
Figure 2B:
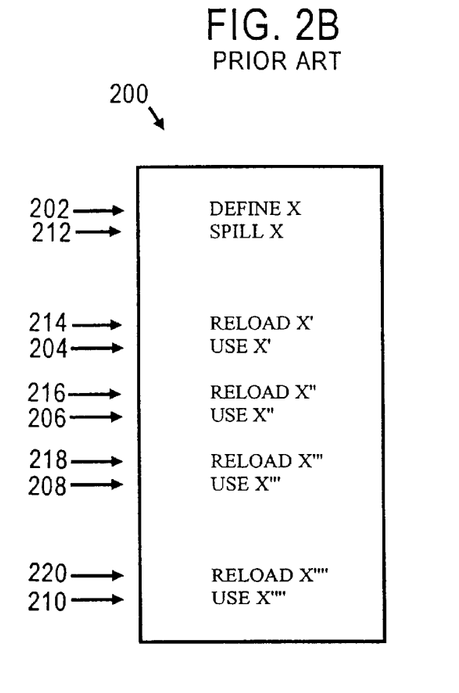
FIG. 2B illustrates the code block of FIG. 2A including additional code for spilling the variable X.

Consider the example illustrated by FIGS. 2A and 2B. A code block 200 includes code 202 which defines a variable X. Code block 200 also includes code 204, 206, 208 and 210, which use the variable X. Code block 200 may also include other code which is not illustrated.

FIG. 2B illustrates code block 200 which has been modified to reflect the spilling of the variable X. Specifically, code 212 has been added immediately following code 202, to perform a spill operation on the variable X. As previously discussed, the spill operation writes the variable X from a physical register to another memory location, such as a runtime stack.

In addition, code 214 has been added immediately before code 204 to perform a reload operation on the variable X, which causes the variable X to be reloaded into a physical register as X'. Code 204 then uses the reloaded variable X'. Similarly, code 216 has been added immediately before code 206 to reload the variable X as X", which is then used by code 206. Also, code 218 and 220 have also been added to reload the variable X as X'" and X"", respectively.

As is illustrated by code block 200 in FIG. 2B, performing spilling of variable X involves both writing the variable X from a physical register to another memory location (a spill operation), and also writing the variable X from the memory location into a physical register (a reload operation) for each occurrence of variable X in code block 200. Conventional spill algorithms do not discriminate as to where the additional code to perform the reload operations is added. Rather, the code instructions for performing the reload operations is added prior to each and every use of the spill variable. This can adversely affect performance when a reload operation is added to a portion of code instructions which is repeated many times, such as a loop. Also, a physical register conflict may only occur at one location in a code block and yet, according to conventional approaches, code to perform a reload operation is added at every use of the spill variable.

In view of the need for spilling virtual registers to provide for the mapping of a set of virtual registers to a set of physical registers, and the limitations in the prior approaches, there is a need for an approach for allocating a set of virtual registers to a set of physical registers that uses a more efficient approach for register spilling.

SUMMARY OF THE INVENTION

These and other needs are met by a method and apparatus which minimize register spilling in an optimizing compiler by updating a first set of code instructions to include one or more code instructions for causing specified data to be stored in a first memory location during the execution of the first set of code instructions.

First, a code region hierarchy is determined based upon the first set of code instructions, wherein the code region hierarchy includes a set of code regions. Then, a second set of code instructions is generated based upon both the code region hierarchy and the specified data, wherein the execution of the second set of code instructions causes the specified data to be moved from a second memory location to the first memory location. A third set of instructions is generated based upon both the code region hierarchy and the specified data, wherein the execution of the third set of code instructions causes the specified data to be moved from the first memory location to the second memory location. Finally, both the second set of code instructions and the third set of code instructions are both added to one or more locations in the first set of code instructions based upon code region boundaries specified by the code region hierarchy, such that register spilling is reduced.

The foregoing and other features, aspects and advantages of the present invention will become more apparent from the following detailed description of the present invention when taken in conjunction with the accompanying drawings.

BRIEF DESCRIPTION OF THE DRAWINGS

Embodiments of the invention are illustrated by way of example, and not by way of limitation, in the figures of the accompanying drawings and in which like reference numerals refer to similar elements and in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, through not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE PREFERRED EMBODIMENT

An approach for allocating a set of virtual registers to a set of physical registers using selective spilling is described. In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

In general, selective spilling is a top down approach for updating a set of code instructions at specific locations to reflect the spilling of specified spill data. First, the set of code instructions and specified spill data to be spilled are received. Then a code region hierarchy containing a set of code regions is determined based upon the set of instructions. Starting with the highest level, the code region hierarchy is analyzed to determine whether the specified spill data is referenced (live) in more than one code region. If so, then code instructions for performing a spill operation on the specified spill data are added to the set of code instructions at the boundary of the code region that contains code instructions for defining the specified spill data. Then, code instructions for performing a reload operation on the specified spill data are added to the set of code instructions at the boundaries of other code regions that use the specified spill data. The effect of adding the code to perform the spill and reload operation is to split the lifetime of the spill variable into smaller constituent lifetimes. Instead of the spill variable being present in a physical register during the execution of a block of code, the spill variable is written from a physical register to another memory location and then reloaded into the physical register at particular locations in the block of code where the contents of the spill variable are required by certain instructions in the block of code. If the specified spill data is only referenced in one code region, then that code region's inner code regions are evaluated in a similar manner.

Detailed Description

The approach for allocating a set of virtual registers to a set of physical register using selective spilling according to an embodiment of the invention is now described with reference to FIGS. 3A–3E.

Figure 3A:
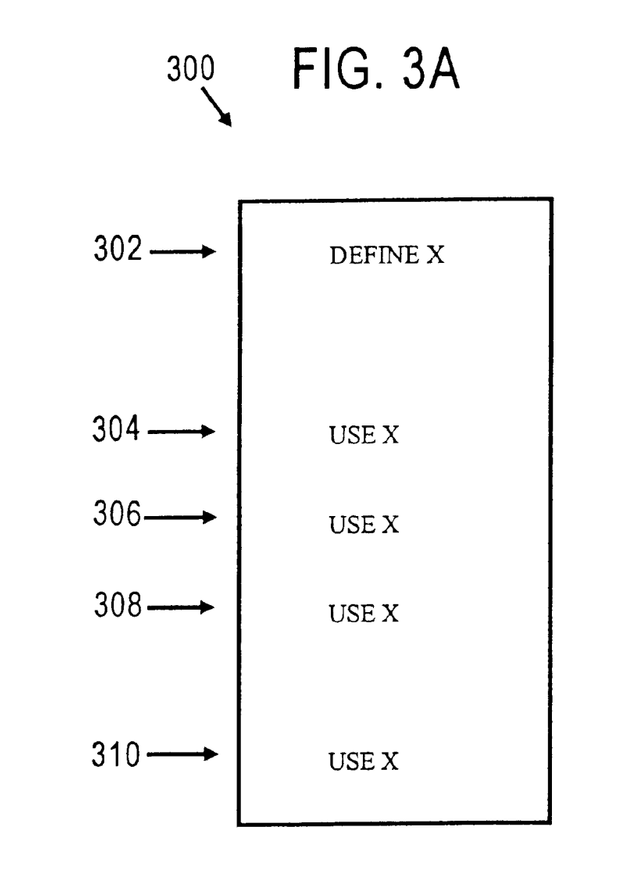
FIG. 3A illustrates a code block containing references to a variable X.

As illustrated in FIG. 3A, code block 300 includes code 302 which defines a variable X. Code block 300 also includes code 304, 306, 308 and 310, which use the variable X. Code block 300 may also include other code which is not illustrated. To selectively spill the variable X according to an embodiment of the invention, a code region hierarchy that includes a set of code regions is determined based upon code block 300. Each code region represents a set of code blocks, where each code block represents a sequence of instructions in which the flow of execution starts with the first instruction in the sequence and ends with the last instruction in the sequence, without termination or branching out of the sequence of instructions, other than by execution of the last instruction in the sequence. For example, a code region may contain straight sequences of consecutive instructions as well as loops, for repeating certain sequences.

Figure 3B:
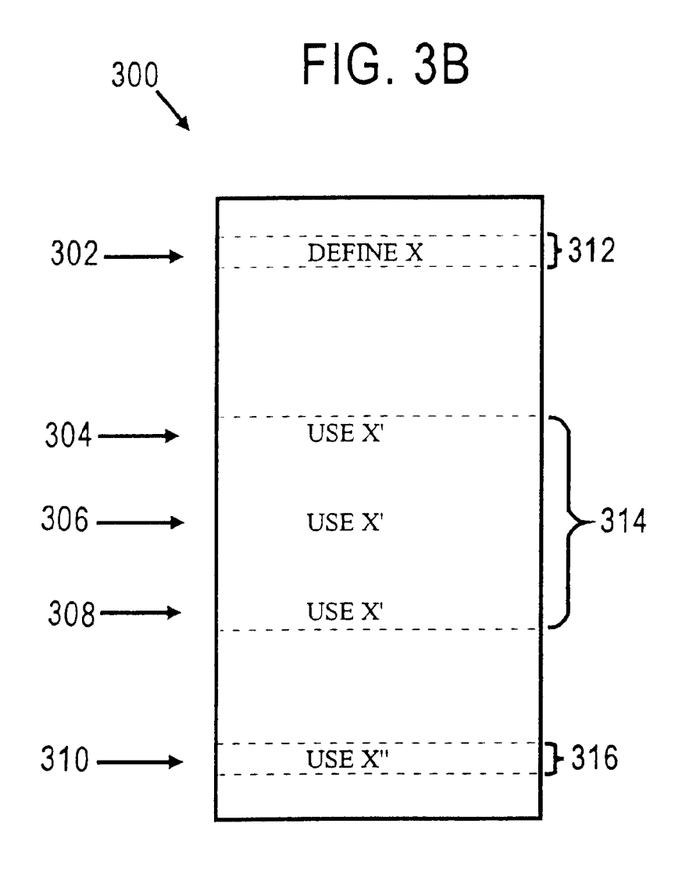
FIG. 3B illustrates the code block of FIG. 3A including regions according to an embodiment of the invention.

As illustrated in FIG. 3B, the highest level of the code region hierarchy includes code regions 312, 314 and 316, which each contains code which references the variable X. Specifically, code region 312 includes code in code block 300 which defines the variable X. On the other hand, code regions 314 and 316 each contain code which uses the variable X.

Figure 3C:
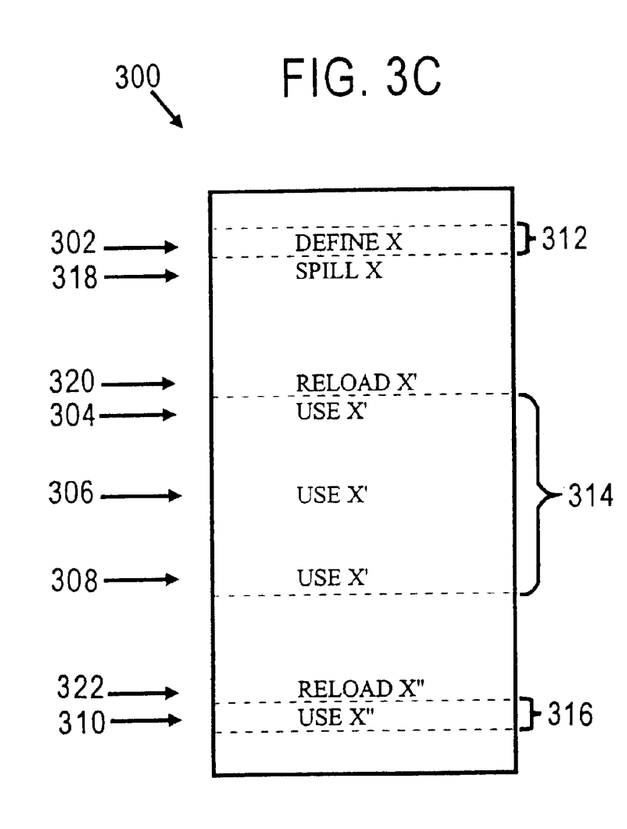
FIG. 3C illustrates the code block of FIG. 3B including additional code for spilling the variable X according to an embodiment of the invention.

Once the code region hierarchy has been determined, the code region hierarchy is analyzed to determine whether the variable X is referenced (live) in more than one region. Since the variable X is referenced in code region 312, 314 and 316, code added to code block 300 to split the lifetime of the variable X into smaller constituent lifetimes. Specifically, as illustrated in FIG. 3C, code 318 has been added to code block 300 after code region 312 to perform a spill operation on variable X. As previously described, a spill operation writes the variable X from a physical register to another memory location, such as a runtime stack.

Code 320 has also been added to code block 300 before code region 314 to reload the variable X from the memory location into a physical register as X'. Then the variable X' is used by code 304, 306 and 308. This approach requires only a single reload operation, performed by code 320, for all code contained in code region 314, even if code 304, 306 and 308 are executed multiple times, such as in code loops. Similarly, code 322 has also been added to code block 300 before code region 316 to reload the variable X into a physical register as X" which is then used by code 310.

In some situations, a register conflict graph built upon code block 300 as illustrated in FIG. 3C may still not be colorable, even though the variable X has been spilled. In this situation, another spill variable is selected according to any well-known approach for selecting a spill variable to resolve a conflict in a register conflict graph and then the process is repeated.

For example, suppose the variable X' is next selected as the spill variable. As before, the highest level of the code region hierarchy, as represented by code regions 312, 314 and 316, is analyzed to determine whether the variable X' is referenced (live) in more than one code region. As illustrated in FIG. 3C, the variable X' is only referenced in code region 314. Therefore, according to an embodiment of the invention, this inner code regions of code region 314 are considered.

Figure 3D:
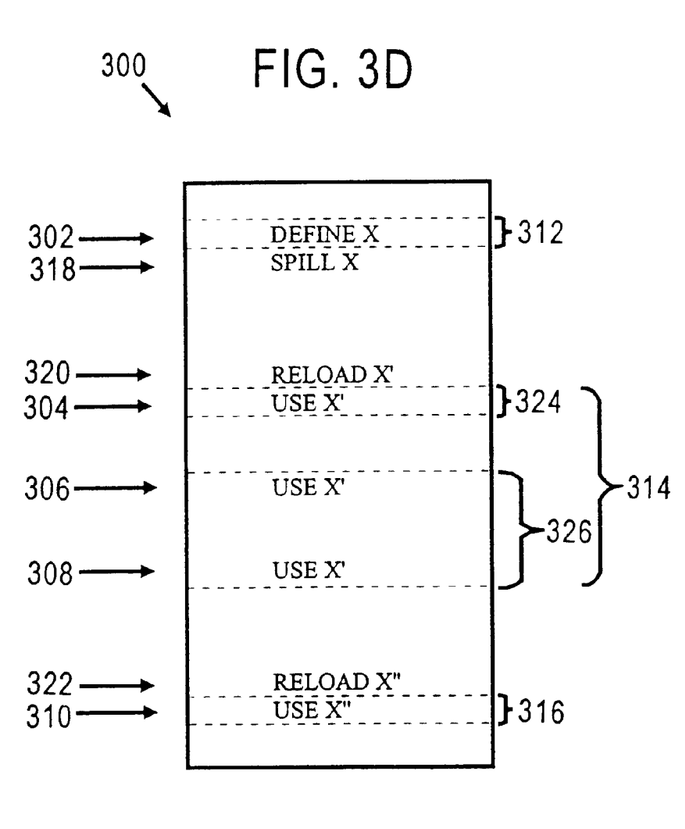
FIG. 3D illustrates the code block of FIG. 3C including additional regions according to an embodiment of the invention.
Figure 3E:
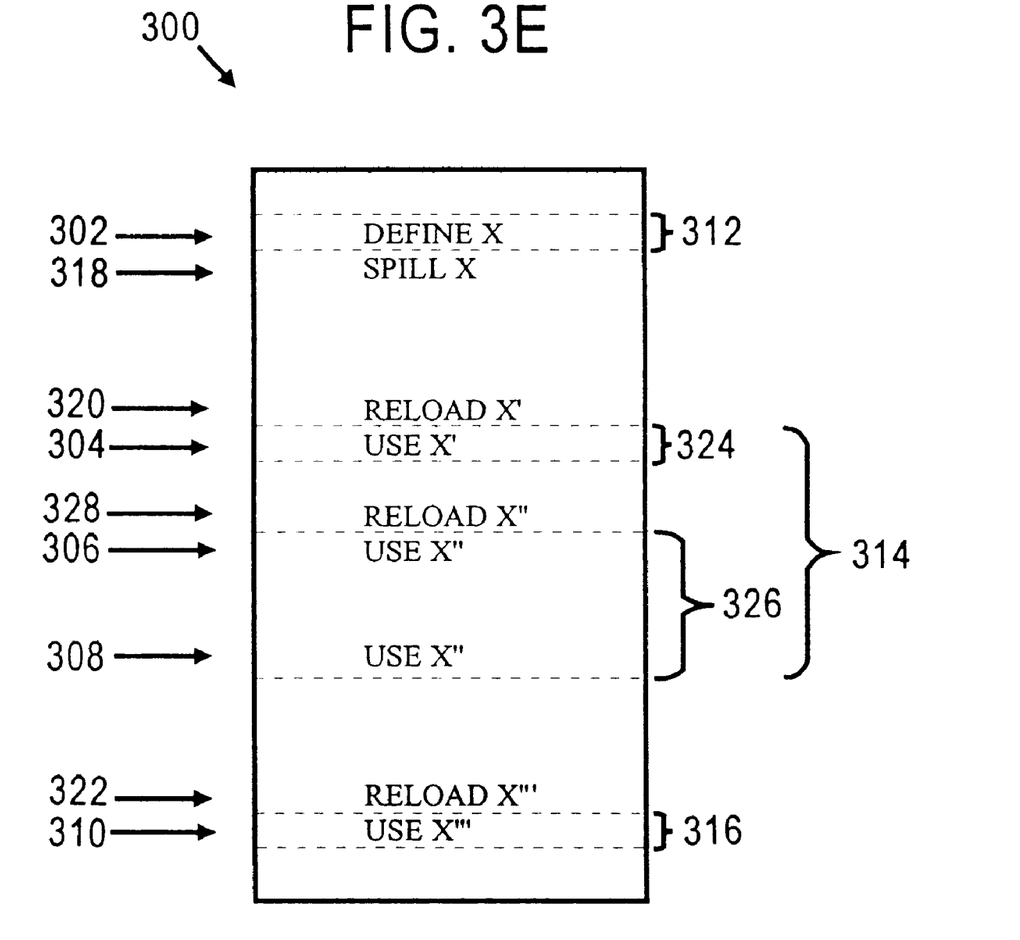
FIG. 3E illustrates the code block of FIG. 3D including additional code for spilling the variable X according to an embodiment of the invention.

As illustrated in FIGS. 3D and 3E, the inner code regions of code region 314 include code region 324 and code region 326, which each contain code that reference the variable X'. Specifically, code region 324 includes code 304 which uses variable X' while code region 326 includes code 306 and code 308 which both use the variable X". Since the variable X' is referenced (live) in both code region 324 and code region 326, code 328 (FIG. 3E) is added to code block 300 to reload the variable X as X", effectively making code 322 perform the reload of the variable X as X'''.

According to another embodiment of the invention, code which has been added for performing a spill or reload operation is relocated inside of a code region when the number of instructions between the code for performing the spill or reload operation and the code specifying the definition or use of the spill variable is large.

For example, referring to FIG. 3E, suppose that because of a large number of instructions between code 302, which defines the variable X, and code 318, which performs a spill operation on the variable X, that a register conflict graph for code block 300 cannot be colored. Then, according to an embodiment of the invention, code 318 is relocated inside code region 312 just below code 302, to reduce the amount of time that the variable X resides in a physical register.

Similarly, suppose that in code region 326 the only use of the variable X was by code 308 and not code 306, and that code region 326 contains a large number of instructions above code 308. If a register conflict graph for code block 300 cannot be colored, then according to an embodiment of the invention, code 328 is relocated inside code region 326 just above code 308 to reduce the amount of time that the variable X resides in a physical register.

The approach for allocating a set of virtual registers to a set of physical registers using selective spilling according to an embodiment of the invention has been described in the context of incrementally spilling the lifetime of a single spill variable X into smaller constituent lifetimes (X', X", X'"). However, the approach is also applicable to spilling any number of different variables, such as X and then Y.

Figure 4A:
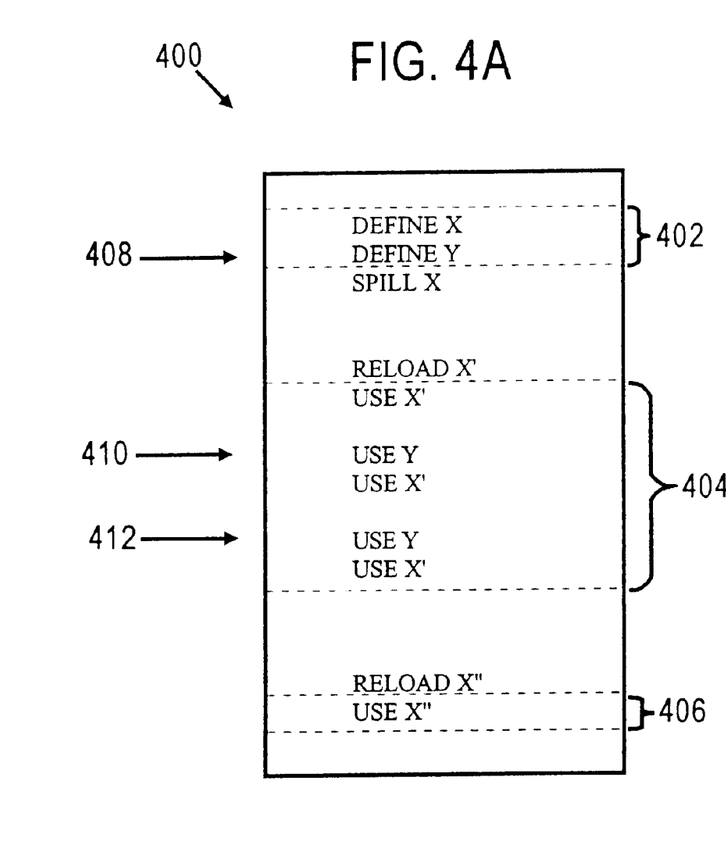
FIG. 4A illustrates a code block containing references to variables X and Y and code for performing a spill operation and one or more reload operations on the variable X.

FIG. 4A illustrates a code block 400 that includes code for spilling a variable X. Suppose after an analysis of code block 400, a determination is made that a register conflict graph associated with code block 400 cannot be colored and that the variable Y is to be spilled. First, a code region hierarchy is determined based upon code block 400 and includes code regions 402, 404 and 406. Code region 402 includes code 408 which defines the variable Y. In addition, code region 404 includes code 410 and 412 which used the variable Y. Code region 406 does not contain a reference to the variable Y.

Figure 4B:
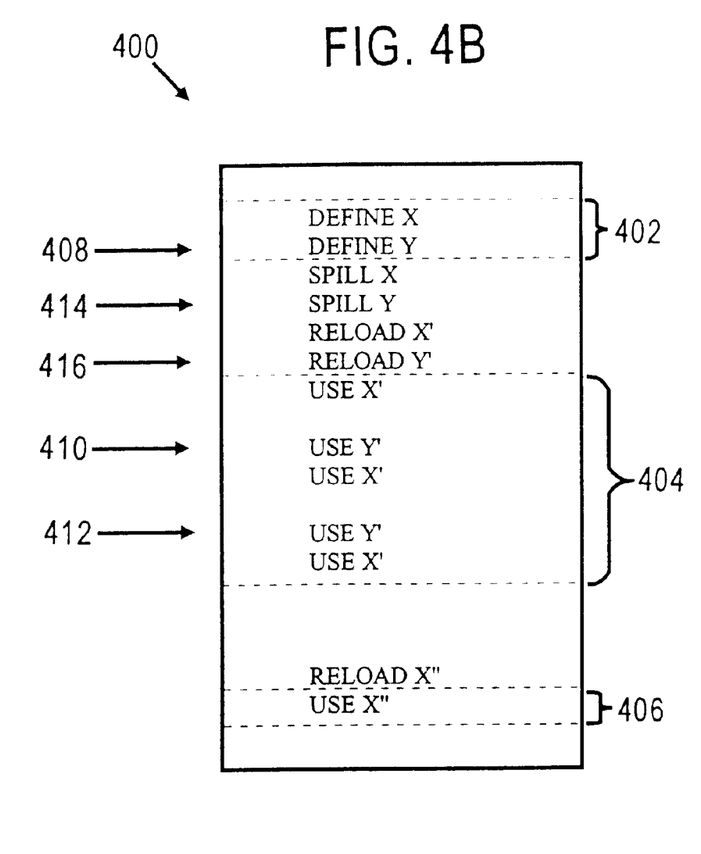
FIG. 4B illustrates the code block of FIG. 4A including additional code for performing a spill operation and a reload operation on the variable Y.

Then, the code region hierarchy is evaluated to determine whether the variable Y is referenced in more than one code region. As illustrated in FIG. 4B, the variable Y is reference (live) in more than one code region. In accordance with an embodiment of the invention, code 414 is added to code block 400 to perform a spill operation on the variable Y. In addition, code 416 is added to code block 400 to perform a reload operation of the variable Y as Y'.

Figure 4C:
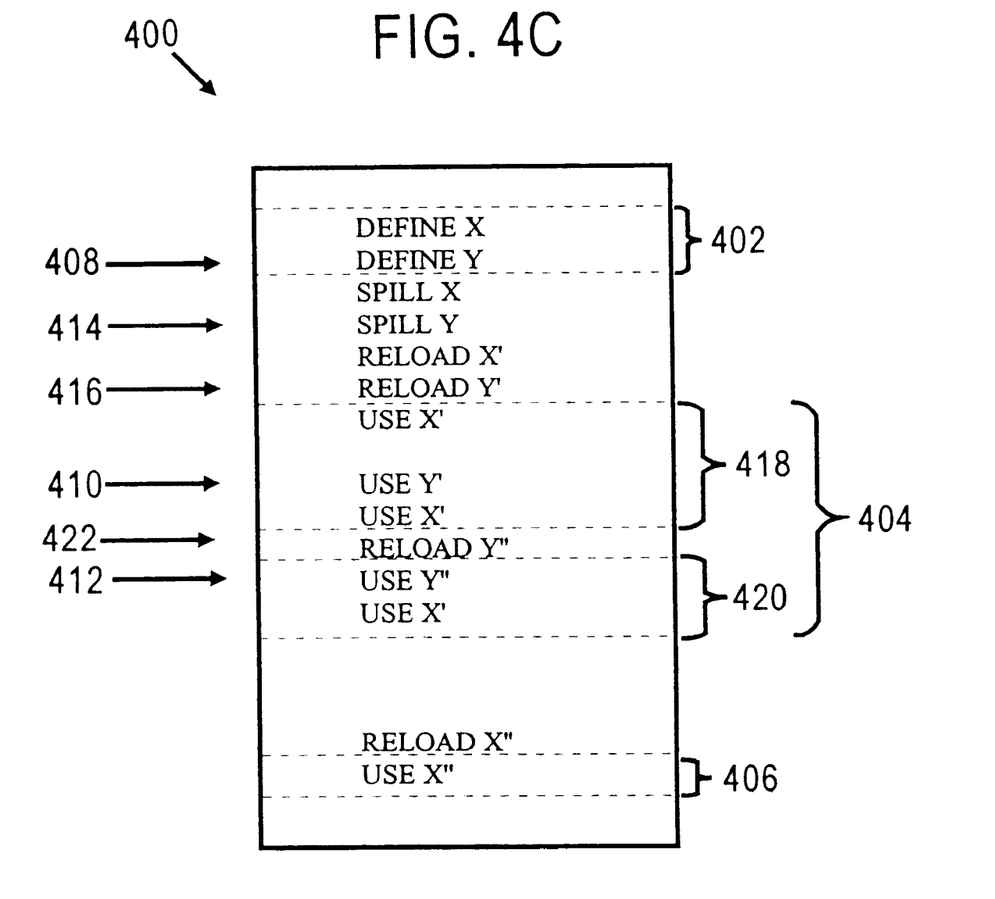
FIG. 4C illustrates the code block of FIG. 4B including additional code for performing an additional reload operation on the variable Y.

If a register conflict graph built upon code block 400 as illustrated in 4B cannot be colored, then another variable must be spilled. If the variable Y' is specified as the spill variable, then the code hierarchy is evaluated to determine whether the variable Y' is referenced (live) in more than one code region. Since the variable Y' is only referenced in code region 404, the inner region of code region 404 are evaluated. As illustrated in FIG. 4C, code region 414 includes two inner code regions, 418 and 420, which each reference the variable Y'. Therefore, according to an embodiment of the invention, code 422 is added above the boundary of code region 420 to reload the variable Y as Y".

Figure 5:
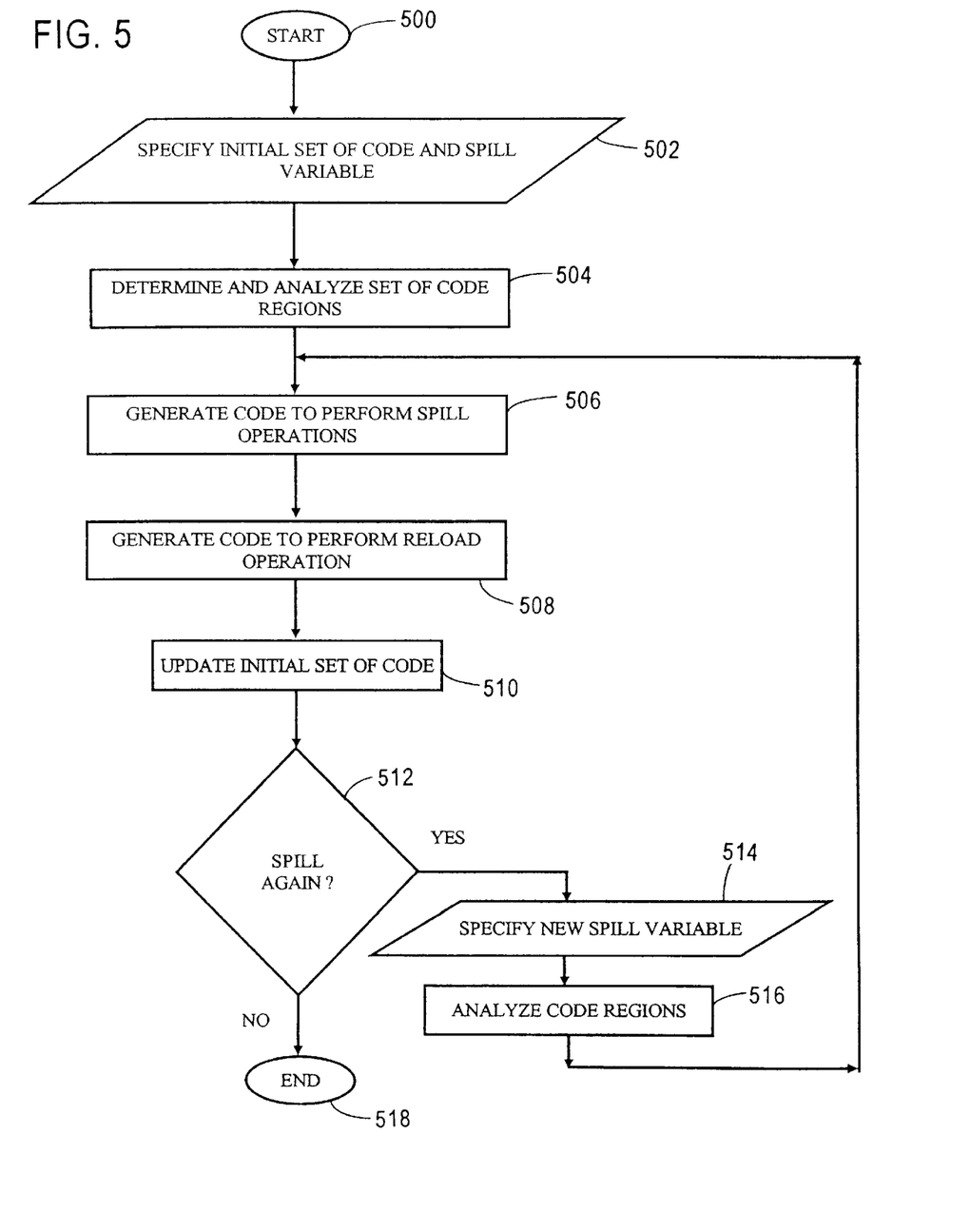
FIG. 5 is a flow chart illustrating a method for allocating a set of virtual registers to a set of physical registers using selective spilling according to an embodiment of the invention.

The method for allocating a set of virtual registers to a set of physical registers using selective spilling is now described with reference to the flow chart of FIG. 5. After starting in step 500, in step 502 an initial set of code and an identification of a spill variable are specified in step 502. As previously described, the specification of a spill variable is is well-known algorithms for resolving conflicts in register conflict graphs.

In step 504 a code hierarchy including a set of code regions is determined based upon the initial set of code and then analyzed as previously described. In step 506 code is generated to perform a spill operation on the specified spill variable. In step 508 code is generated to perform a reload operation on the specified spill variable. As previously described, a reload operation copies the specified variable from the memory location to a physical register. In step 510, the initial set of code is updated to include the code to perform the spill and reload operations.

In step 512, a determination is made as to whether an additional spill is required, based upon whether the set of virtual registers associated with the code can be mapped to the available physical registers. As previously described, according to one embodiment of the invention, a registered conflict graph based upon the initial set of code is analyzed to determine whether or not a conflict exists. If so, then in step 514, a new spill variable is specified. Then, in step 516 the code regions are again analyzed. In step 506 code is generated to perform a spill operation on the new spill variable. In situations when the new spill variable is a derivative of a previously spilled variable, such as X' or X" of X, this step is often not necessary because code to spill the variable X was previously generated. In step 508 code is generated to perform a reload operation based upon the new spill variable and the updated set of code. Then, in step 510 the code is again updated to include the new code to perform the reload operation from step 508. Steps 506–516 are repeated until no further spill operations are required, at which point, the process is complete in step 518.

Although embodiments of the invention have been described in the context of using selective spilling a spill variable, the invention is also applicable to spilling any specified data.

Hardware Overview

Figure 6:
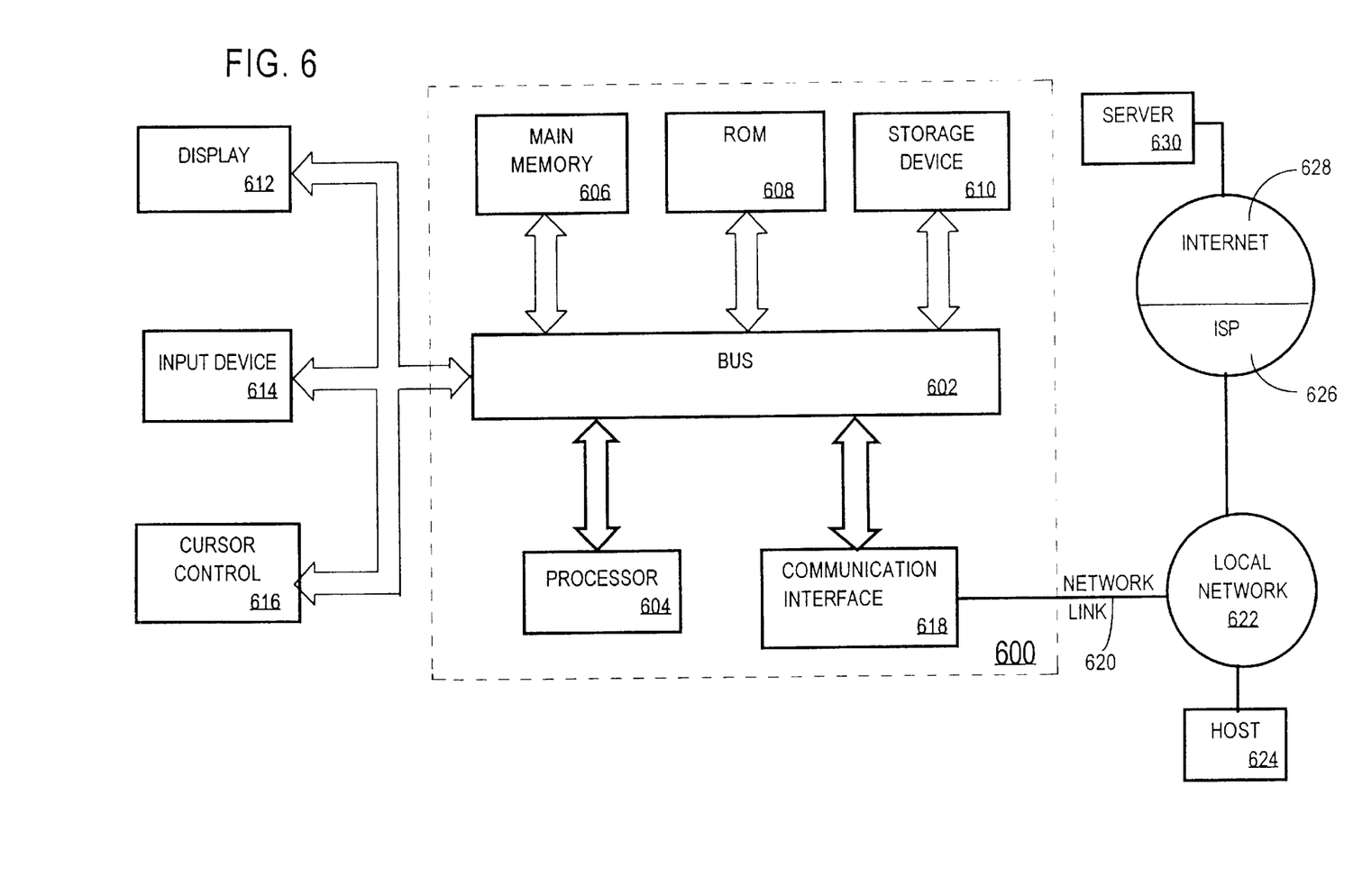
FIG. 6 is a block diagram of a computer system on which embodiments of the invention may be implemented.

FIG. 6 is a block diagram which illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 also includes a read only memory (ROM) 608 or other static storage device coupled to bus 602 for storing static information and instructions for processor 604. A storage device 610, such as a magnetic disk or optical disk, is also provide and coupled to bus 602 for storing information and instructions.

Computer system 600 may also be coupled via bus 602 to a display 612, such as a cathode ray tube (CRT), for displaying information to a computer user. An input device 614, including alphanumeric and other keys, is also provided and coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), which allows the device to specify positions in a plane.

The invention is related to the use of computer system 600 to allocate a set of virtual registers to a set of physical registers using selective spilling. According to one embodiment of the invention, the allocation of a set of virtual registers to a set of physical registers using selective spilling is provided by computer system 600 in response to processor 604 executing sequences of instructions contained in main memory 606. Such instructions may be read into main memory 606 from another computer-readable medium, such as storage device 610. However, the computer-readable medium is not limited to devices such as storage device 610. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer is capable of reading. Execution of the sequences of instructions contained in main memory 606 causes processor 604 to perform the process steps previously described. In alternative embodiments, hard-wired circuitry may be used in place of or in combination with software instructions to implement the invention. Thus, embodiments of the invention are not limited to any specific combination of hardware circuitry and software.

Computer 600 also includes a communication interface 618 coupled to bus 602. Communication interface 618 provides a two-way data communication coupling to a network link 620 to a local network 622. For example, if communication interface 618 is an integrated services digital network (ISDN) card or a modem, communication interface 618 provides a data communication connection to the corresponding type of telephone line. If communication interface 618 is a local area network (LAN) card, communication interface 618 provides a data communication connection to a compatible LAN. Wireless links are also possible. In any such implementation, communication interface 618 sends and receives electrical, electromagnetic or optical signals which carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals which carry digital data streams. The signals through the various networks and the signals on network link 620 and through communication interface 618, which carry the digital data to and from computer 600 are exemplary forms of carrier waves transporting the information.

Computer 600 is capable of sending messages and receiving data, including program code, through the network(s), network link 620 and communication interface 618. In the Internet example, a server 630 might transmit a requested code for an application program through Internet 628, ISP 626, local network 622 and communication interface 618. In accord with the invention, one such downloaded application provides for the allocation of a set of virtual registers to a set of physical registers using selective spilling as described herein.

The received code may be executed by processor 604 as it is received, and/or stored in storage device 610, or other non-volatile storage for later execution. In this manner, computer 600 may obtain application code in the form of a carrier wave.

The invention described herein may be employed as part of a computer language compiler or as a stand alone process for allocating registers using selective spilling.

The invention provides several advantages over prior approaches for allocating a set of virtual registers to a set of physical registers using spilling. First, code for performing spill and reload operations is not included in the code at every reference to the spill variable. Instead, a code region hierarchy is defined based upon the code and the spill variable so that the additional code for performing the spill and reload operations is only included at selected code region boundaries. As additional variable spills are required, code is incrementally added to provide additional spilling. This provides a spilling implementation which more closely matches the required spilling granularity.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for minimizing register spilling in an optimizing compiler by updating a first set of code instructions to include one or more code instructions for causing specified data to be stored in a first memory location during the execution of the first set of code instructions, the method comprising the steps of:

a) determining a code region hierarchy based upon the first set of code instructions, wherein the code region hierarchy includes a set of code regions;

b) generating a second set of code instructions based upon both the code region hierarchy and the specified data, wherein the execution of the second set of code instructions causes the specified data to be moved from a second memory location to the first memory location;

c) generating a third set of code instructions based upon both the code region hierarchy and the specified data, wherein the execution of the third set of code instructions causes the specified data to be moved from the first memory location to the second memory location; and d) adding both the second set of code instructions and the third set of code instructions to one or more locations in the first set of code instructions based upon code region boundaries specified by the code region hierarchy, whereby register spilling is reduced.

2. The method of claim 1, wherein the step of determining a code region hierarchy based upon the first set of code instructions includes the steps of a) identifying a set of sequences of code instructions contained in the first set of code instructions, wherein the execution of each sequence of instructions starts with the first instruction in the sequence of instructions and ends with the last instruction in the sequence of instructions without termination or branching out of the sequence of instructions other than by execution of the last instruction, and b) assigning each sequence of code instructions in the set of sequences of code instructions to a code region.

3. The method of claim 1, wherein the step of generating a second set of code instructions based upon both the code region hierarchy and the specified data further comprises the steps of a) if the specified data is referenced in one or more code regions specified by a first level of the code region hierarchy then performing the step of generating a set of spill code instructions which when executed, cause the specified data to be moved from a second memory location to the first memory location, and b) if the specified data is referenced in only one code region specified by the first level of the code region hierarchy then performing the step of if the specified data is referenced in one or more code regions which are specified by a second level of the code region hierarchy and which correspond to the code region specified by the first level of the code region hierarchy that references the specified data then performing the step of generating a set of spill code instructions which when executed, cause the specified data to be moved from a second memory location to the first memory location.

4. The method of claim 1, wherein the step of generating a third set of code instructions based upon both the code region hierarchy and the specified data further comprises the steps of
   a) if the specified data is referenced in one or more code regions specified by a first level of the code region hierarchy then performing the step of generating a set of reload code instructions which when executed, cause the specified data to be moved from a second memory location to the first memory location, and
   b) if the specified data is referenced in only one code region specified by the first level of the code region hierarchy then performing the step of if the specified data is referenced in one or more code regions which are specified by a second level of the code region hierarchy and which correspond to the code region specified by the first level of the code region hierarchy that references the specified data then performing the step of generating a set of reload code instructions which when executed, cause the specified data to be moved from a second memory location to the first memory location.

5. The method of claim 1, wherein the step of adding both the second set of code instructions and the third set of code instructions to locations in the first set of code instructions based upon code region boundaries specified by the code region hierarchy includes the steps of
   a) adding the second set of code instructions to one or more locations in the first set of code instructions that correspond to one or more boundaries of one or more code regions that contain one or more code instructions that define the specified data, and
   b) adding the third set of code instructions to one or more locations in the first set of code instructions that correspond to one or more boundaries of one or more code regions that contain one or more code instructions that use the specified data.

6. The method of claim 1, wherein
   a) the second memory location comprises a set of physical registers,
   b) the second set of code instructions comprises a set of spill instructions,
   c) the third set of code instructions comprises a set of reload instructions,
   d) the step of generating a second set of code instructions based upon both the code region hierarchy and the specified data, wherein the execution of the second set of code instructions causes the specified data to be moved from a second memory location to the first memory location includes the step of generating a set of spill code instructions based upon both the code region hierarchy and the specified data, wherein the execution of the set of spill code instructions causes the specified data to be moved from the set of physical registers to the first memory location,
   e) the step of generating a third set of code instructions based upon both the code region hierarchy and the specified data, wherein the execution of the third set of code instructions causes the specified data to be moved from the first memory location to the second memory location includes the step of generating a set of reload code instructions based upon both the code region hierarchy and the specified data, wherein the execution of the set of reload code instructions causes the specified data to be moved from the first memory location to the set of physical registers,
   f) the step of adding both the second set of code instructions and the third set of code instructions to one or more locations in the first set of code instructions based upon code region boundaries specified by the code region hierarchy includes the step of adding both the set of spill code instructions and the set of reload code instructions to one or more locations in the first set of code instructions based upon code region boundaries specified by the code region hierarchy.

7. A computer system for minimizing register spilling in an optimizing compiler, the computer system comprising:
   a) a memory;
   b) one or more processors coupled to the memory, wherein the one or more processors are configured
      to update the first set of code instructions to include one or more code instructions for causing specified data to be stored in a first memory location during the execution of the first set of code instructions based upon code region boundaries associated with a set of code regions specified by a code region hierarchy determined from the first set of instructions, and
      to determine whether the specified data is referenced in one or more code regions specified by a first level of the code region hierarchy,
         if the specified data is referenced in one or more code regions specified by the first level of the code region hierarchy then to generate a set of reload code instructions for causing the specified data to be moved from a second memory location to the first memory location, and
         if the specified data is referenced in only one code region specified by the top level of the code region hierarchy then to examine one or more other levels of the code region hierarchy which correspond to the code region specified by the top level of the code region hierarchy that references the specified data.

8. A computer program embodied in a computer-readable medium for minimizing register spilling in an optimizing compiler by updating a first set of code instructions to include one or more code instructions for causing specified data to be stored in a first memory location during the execution of the first set of code instructions, the computer program comprising:
   a) a first code segment for determining a code region hierarchy based upon the first set of code instructions, wherein the code region hierarchy includes a set of code regions;
   b) a second code segment for generating a second set of code instructions based upon both the code region hierarchy and the specified data, wherein the execution of the second set of code instructions causes the specified data to be moved from a second memory location to the first memory location;
   c) a third code segment for generating a third set of code instructions based upon both the code region hierarchy and the specified data, wherein the execution of the third set of code instructions causes the specified data to be moved from the first memory location to the second memory location; and d) a fourth code segment for adding both the second set of code instructions and the third set of code instructions to locations in the first set of code instructions based upon code region boundaries specified by the code region hierarchy, whereby register spilling is reduced.

9. The computer program embodied in a computer-readable medium of claim 8, wherein the first code segment for determining a code region hierarchy based upon the first set of code instructions includes code for a) identifying a set of sequences of code instructions contained in the first set of code instructions, wherein the execution of each sequence of instructions starts with the first instruction in the sequence of instructions and ends with the last instruction in the sequence of instructions without termination or branching out of the sequence of instructions other than by execution of the last instruction, and b) assigning each sequence of code instructions in the set of sequences of code instructions to a code region.

10. The computer program embodied in a computer-readable medium of claim 8 wherein the second code segment for generating a second set of code instructions based upon both the code region hierarchy and the specified data includes code for a) if the specified data is referenced in one or more code regions specified by a first level of the code region hierarchy then performing the step of generating a set of spill code instructions which when executed, cause the specified data to be moved from a second memory location to the first memory location, and b) if the specified data is referenced in only one code region specified by the first level of the code region hierarchy then performing the step of if the specified data is referenced in one or more code regions which are specified by a second level of the code region hierarchy and which correspond to the code region specified by the first level of the code region hierarchy that references the specified data then performing the step of generating a set of spill code instructions which when executed, cause the specified data to be moved from a second memory location to the first memory location.

11. The computer program embodied in a computer-readable medium of claim 8 wherein the third code segment for generating a third set of code instructions based upon both the code region hierarchy and the specified data includes code for a) if the specified data is referenced in one or more code regions specified by a first level of the code region hierarchy then performing the step of generating a set of reload code instructions which when executed, cause the specified data to be moved from a second memory location to the first memory location, and b) if the specified data is referenced in only one code region specified by the top level of the code region hierarchy then performing the step of if the specified data is referenced in one or more code regions which are both specified by a second level of the code region hierarchy and which correspond to the code region specified by the top level of the code region hierarchy that references the specified data then performing the step of generating a set of reload code instructions which when executed, cause the specified data to be moved from a second memory location to the first memory location.

12. A computer data signal embodied in a carrier wave and representing a computer program for minimizing register spilling in an optimizing compiler by updating a first set of code instructions to include one or more code instructions for causing specified data to be stored in a first memory location during the execution of the first set of code instructions, the computer program comprising:

a) a first code segment for determining a code region hierarchy based upon the first set of code instructions, wherein the code region hierarchy includes a set of code regions;

b) a second code segment for generating a second set of code instructions based upon both the code region hierarchy and the specified data, wherein the execution of the second set of code instructions causes the specified data to be moved from a second memory location to the first memory location;

c) a third code segment for generating a third set of code instructions based upon both the code region hierarchy and the specified data, wherein the execution of the third set of code instructions causes the specified data to be moved from the first memory location to the second memory location; and d) a fourth code segment for adding both the second set of code instructions and the third set of code instructions to the first set of code instructions based upon the code region hierarchy, whereby register spilling is reduced.

13. The computer data signal of claim 12, wherein the first code segment for determining a code region hierarchy based upon the first set of code instructions includes code for a) identifying a set of sequences of code instructions contained in the first set of code instructions, wherein the execution of each sequence of instructions starts with the first instruction in the sequence of instructions and ends with the last instruction in the sequence of instructions without termination or branching out of the sequence of instructions other than by execution of the last instruction, and b) assigning each sequence of code instructions in the set of sequences of code instructions to a code region.

14. The computer data signal of claim 12 wherein the second code segment for generating a second set of code instructions based upon both the code region hierarchy and the specified data includes code for a) if the specified data is referenced in one or more code regions specified by a first level of the code region hierarchy then performing the step of generating a set of spill code instructions which when executed, cause the specified data to be moved from a second memory location to the first memory location, and b) if the specified data is referenced in only one code region specified by the first level of the code region hierarchy then performing the step of if the specified data is referenced in one or more code regions which are specified by a second level of the code region hierarchy and which correspond to the code region specified by the first level of the code region hierarchy that references the specified data then performing the step of generating a set of spill code instructions which when executed, cause the specified data to be moved from a second memory location to the first memory location.

15. The computer data signal of claim 12 wherein the third code segment for generating a third set of code instructions based upon both the code region hierarchy and the specified data includes code for a) if the specified data is referenced in one or more code regions specified by a first level of the code region hierarchy then performing the step of generating a set of reload code instructions which when executed, cause the specified data to be moved from a second memory location to the first memory location, and b) if the specified data is referenced in only one code region specified by the first level of the code region hierarchy then performing the step of if the specified data is referenced in one or more code regions which are specified by a second level of the code region hierarchy and which correspond to the code region specified by the first level of the code region hierarchy that references the specified data then performing the step of generating a set of reload code instructions which when executed, cause the specified data to be moved from a second memory location to the first memory location.

* * * * *